United States Patent
Awadh et al.

(10) Patent No.: US 11,446,612 B2
(45) Date of Patent: Sep. 20, 2022

(54) SIMULTANEOUS SORPTION OF DYES AND TOXIC METALS FROM WATERS USING TITANIA-INCORPORATED POLYAMIDE

(71) Applicant: King Fahd University of Petroleum and Minerals, Dhahran (SA)

(72) Inventors: Tawfik Abdo Saleh Awadh, Dhahran (SA); Saddam Ahmed Al-Hammadi, Dhahran (SA); Islam Ali Elsayed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 487 days.

(21) Appl. No.: 16/554,097

(22) Filed: Aug. 28, 2019

(65) Prior Publication Data

US 2021/0046431 A1    Feb. 18, 2021

Related U.S. Application Data

(60) Provisional application No. 62/886,624, filed on Aug. 14, 2019.

(51) Int. Cl.
| | | |
|---|---|---|
| *B01D 71/00* | (2006.01) | |
| *B01D 71/02* | (2006.01) | |
| *C02F 1/28* | (2006.01) | |
| *B01D 69/12* | (2006.01) | |

(Continued)

(52) U.S. Cl.
CPC ......... *B01D 71/024* (2013.01); *B01D 69/125* (2013.01); *B01D 71/56* (2013.01); *C02F 1/288* (2013.01); *B01D 2253/306* (2013.01); *B01D 2253/311* (2013.01); *B01D 2257/206* (2013.01); *B01D 2257/40* (2013.01); *B01D 2257/602* (2013.01); *B82Y 30/00* (2013.01)

(58) Field of Classification Search
CPC .............................. B82Y 30/00; B82Y 40/00
See application file for complete search history.

(56) References Cited

U.S. PATENT DOCUMENTS 10,407,367 B2 *   9/2019   Noda ................... B01D 53/228
10,773,957 B2 *   9/2020   Vos ........................ C07C 51/377
(Continued)

FOREIGN PATENT DOCUMENTS

| CN | 1903417 A | 1/2007 |
|---|---|---|
| CN | 103301756 A | 9/2013 |
| CN | 102743984 B | 10/2014 |

(Continued)

OTHER PUBLICATIONS

Lee, Soo Hyun et al. Desalination 219 (2008) 48-59.*
(Continued)

*Primary Examiner* — Sharon Pregler
(74) *Attorney, Agent, or Firm* — Oblon, McClelland, Maier & Neustadt, L.L.P.

(57) ABSTRACT

A method for making a titania-polymer nanocomposite by simultaneously forming $TiO_2$ nanoparticles in situ from a $TiO_2$ precursor in the presence of urea and interfacially polymerizing polyamide precursors thereby producing a titania-polymer nanocomposite. A titania-polymer nanocomposite made by this method. A method for removing a dye or metal from water comprising contacting contaminated water with the titania-polymer nanocomposite.

6 Claims, 19 Drawing Sheets

(51) Int. Cl.
    *B01D 71/56*     (2006.01)
    *B82Y 30/00*     (2011.01)

(56) References Cited

U.S. PATENT DOCUMENTS

2013/0015122 A1     1/2013    Awadh
2018/0085736 A1     3/2018    Kuhn et al.

FOREIGN PATENT DOCUMENTS

| CN | 108554187 A | 9/2018 |
| --- | --- | --- |
| CN | 104209022 B | 11/2018 |

OTHER PUBLICATIONS

Rios-Gomez, et al. ; Efficient combined sorption/photobleaching of dyes promoted by cellulose/titania-based nanocomposite films ; Journal of Cleaner Production vol. 194 ; pp. 167-173 ; Sep. 1, 2018 ; Abstract Only ; 2 Pages.

Sarwar, et al. ; Preparation and properties of polyamide-titania nanocomposites ; Journal of Sol-Gel Science and Technology, 44:41 ; Jul. 12, 2007 ; 1 Page ; Abstract Only.

Khorshidi, et al. ; Robust fabrication of thin film polyamide-TiO2 nanocomposite membranes with enhanced thermal stability and anti-biofouling propensity ; Scientific Reports ; Jan. 15, 2018 ; 10 Pages.

Lombardi, et al. ; Electrospun polyamide-6membranes containing titanium dioxide as photocatalyst ; Wiley Online Library ; Oct. 14, 2010 ; 6 Pages.

\* cited by examiner

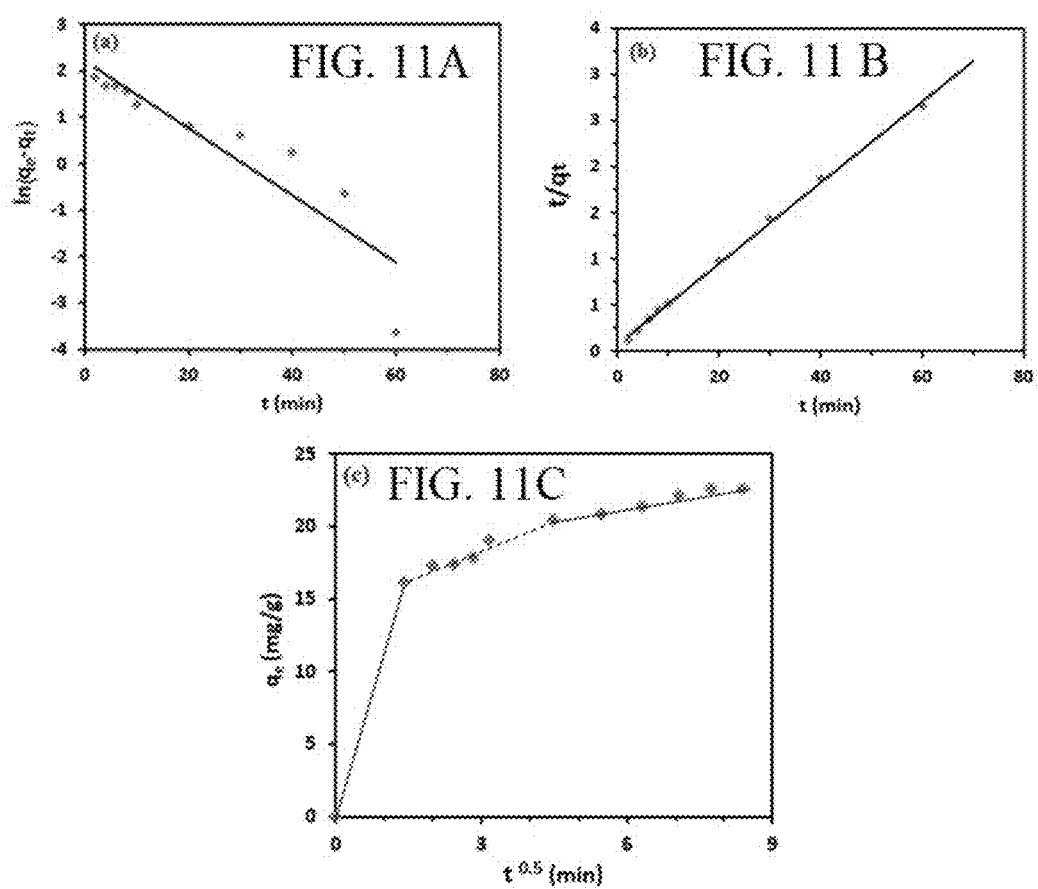

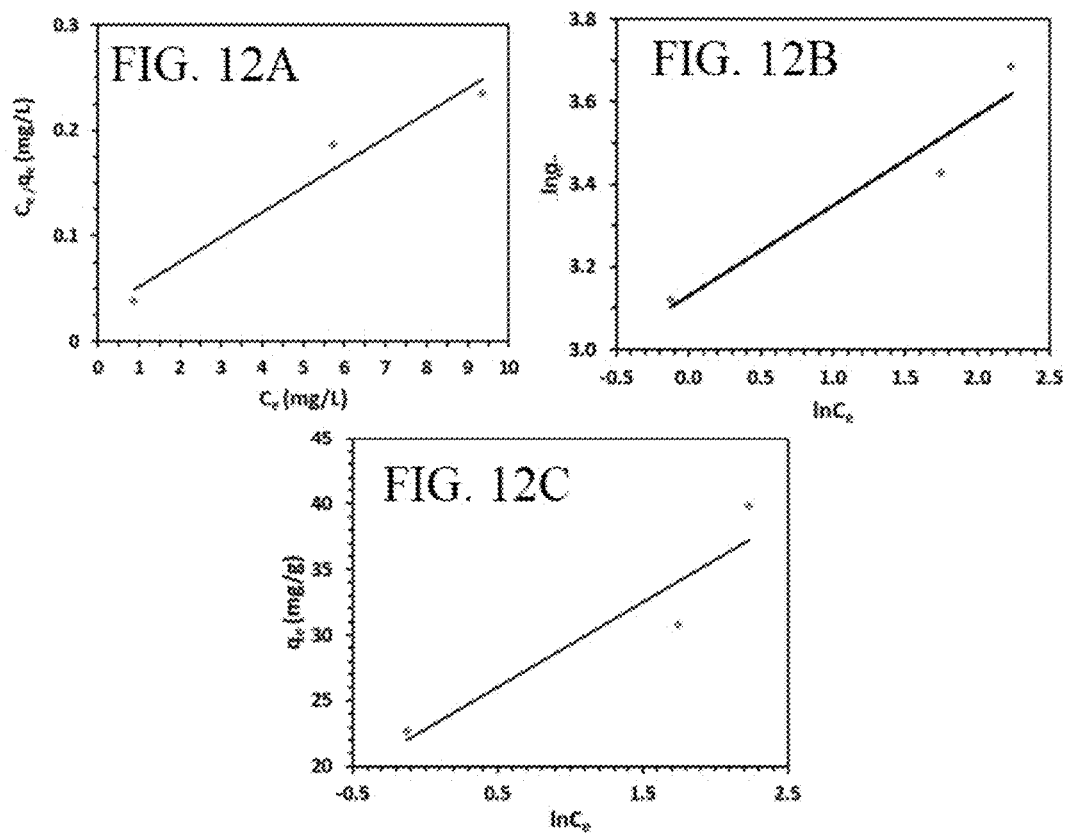

SIMULTANEOUS SORPTION OF DYES AND TOXIC METALS FROM WATERS USING TITANIA-INCORPORATED POLYAMIDE

CROSS-REFERENCE TO RELATED APPLICATION

This application claims priority to U.S. Provisional Application No. 62/886,624 filed Aug. 14, 2019 which is incorporated by reference for all purposes.

STATEMENT REGARDING PRIOR DISCLOSURES BY THE INVENTOR OR A JOINT INVENTOR

Aspects of this technology are discussed by Ali, et al., J. Molecular Liquids 269: 564-571, available online Aug. 14, 2018 which is incorporated by reference for all purposes.

BACKGROUND OF THE INVENTION

Field of the Invention

The invention pertains to simultaneous removal of contaminants, such as dyes and toxic metals, from wastewater water using titania-based materials.

Description of Related Art

Contamination of water, including industrial waste water, with dyes and toxic heavy metals is a serious environmental problem. Synthetic dyes, such as those used to impart color during the manufacture of textiles, paper, plastics, or cosmetics, are very stable and difficult to biodegrade; see R. Sanghi, et al., *Cassia angustifolia seed gum as an effective natural coagulant for decolourisation of dye solutions*, Green Chem. 4 (2002) 252-254; T. A. Saleh, *Isotherm, kinetic, and thermodynamic studies on Hg (II) adsorption from aqueous solution by silica-multiwall carbon nanotubes*, Envir. Sci. Pollut. Res. 22 (2015) 16721-16731.

Many manufacturing processes lead to a discharge of effluents containing toxic dyes that can cause ecological problems; see M. Thakur, et al., *Efficient photocatalytic degradation of toxic dyes from aqueous environment using gelatin-Zr (IV) phosphate nanocomposite and its antimicrobial activity*, Colloids Surf. B: Biointerfaces 157 (2017) 456-463; and T. A. Saleh, *Nanocomposite of carbon nanotubes/silica nanoparticles and their use for adsorption of Pb (II): from surface properties to sorption mechanism*, Desalin. Water Treat. 57 (2016) 10730-10744.

Effluents from textile industries significantly contribute to water pollution in part because dyes can undergo biological and chemical changes reacting with dissolved oxygen thereby leading to unhealthy and unstable aquatic ecosystems and the destruction of aquatic life. Moreover, the products of the degradation of many dyes are toxic and carcinogenic. Therefore, the treatment of textile effluents before their disposal into the receiving water is important to save the environment.

Dyes can be removed from industrial wastewater in several ways including by adsorption, coagulation, flotation, electrochemical techniques, biological treatments, and oxidation. However, most types of dyes, such as neutral red, are soluble in aqueous solutions making many conventional treatment methods ineffective for the removal of dyes from wastewater.

One of the most effective methods for removing dyes is by adsorption which is highly efficient, readily available and easy to handle. Adsorption is widely used and is a well-known process of separation for dealing with many types of chemical pollutants, particularly chemical pollutants that are not removed by biological treatment of wastewater. Compared with other techniques, adsorption shows superior efficiency for the removal of pollutants due to its simplicity, ease of operation, high efficiency, and insensitivity to inhibition by toxic pollutants or other wastewater contaminants.

Contamination of water with metals such as Al, As, Ba, Cd, Cr, Cu, Fe, Pb, Mn, Hg, Se, and Ag is also a significant problem as high levels of these metals can negatively impact the environment and when ingested cause a variety of medical and health problems. For example, arsenic is widespread in the environment due to its natural occurrence and former extensive use in pesticides. Symptoms of chronic arsenic poisoning are weight loss, hair loss, nausea, white lines across the toenails and fingernails, depression, and general fatigue. Cadmium poisoning has been associated with kidney disease, hypertension, and possibly genetic mutation. Chromium may cause lung tumors when inhaled and has adverse effects on aquatic life. Mercury (Hg) poisoning results in weakness, loss of appetite, insomnia, indigestion, diarrhea, gum inflammation, loosening of the teeth, irritability, memory loss, muscle tremors, and brain damage following large doses; and lead (Pb) is a cumulative poison, meaning that it remains in the body following exposure. Children under age three are most susceptible to lead poisoning. Minor symptoms include abdominal pains, decreased appetite, constipation, fatigue, and decreased physical fitness. Long-term exposure may cause kidney damage, anemia, nerve and brain damage, and death.

While several types of adsorbents for use in various applications are under development only some of these have been successfully commercialized; see K. Zhu, et al, *Cr(VI) reduction and immobilization by core-double-shell structured magnetic polydopamine@zeolitic idazolate frameworks-8 microspheres*, ACS Sustain. Chem. Eng. 5 (8) (2017) 6795-6802; W. Yao, et al., *Enhanced removal of methyl orange on calcined glycerol-modified nanocrystallined Mg/Al layered double hydroxides*, Chem. Eng. J. 307 (2017) 476-486; S. Yu, et al., *Boron nitride-based materials for the removal of pollutants from aqueous solutions: a review*, Chem. Eng. J. 333 (2018) 343-360; A. M. Alansi, et al., *Visible-light responsive BiOBr nanoparticles loaded on reduced graphene oxide for photocatalytic degradation of dye*, J. Mol. Liq. 253 (2018) 297-304; T. A. Saleh, et al., *Kinetics, isotherms and thermodynamic evaluation of amine functionalized magnetic carbon for methyl red removal from aqueous solutions*, J. Mol. Liq. 248 (2017) 577-585; and N. Tka, et al., *Amines modified fibers obtained from natural Populus tremula and their rapid biosorption of acid blue 25*, J. Mol. Liq. 250 (2018) 423-432.

There remains a strong demand for versatile adsorbents that can simultaneously adsorb organic pollutants such as dyes as well as toxic metals and which are easy and inexpensive to produce. Accordingly, the inventors sought to identify new ways for producing adsorbents with these useful properties.

BRIEF SUMMARY OF THE INVENTION

A versatile adsorbent which is easy to make and can remove dyes and heavy metals from waste water is disclosed. This versatile adsorbent is conveniently produce by an innovative "single pot" interfacial reaction in which in situ formation of TiO$_2$ from a precursor occurs substantially at the same time as polymerization of a polyamide. As exemplified herein, the interfacial polymerization of trimesoyl chloride (TMC) and 1,3-phenylene diamine (MPD) was simultaneously combined with the in-situ formation of TiO$_2$ from TiCl$_4$ using urea. The structure and morphology of the resulting TiO$_2$— polyamide nanocomposite (TPN) was characterized. Surprisingly, it was found that the nanocomposite simultaneously removed organic pollutants, such as dyes, as well as toxic metals, such as Ni, Cu, Pb, Se, As, Hg, Cd, and Cr, from waste water thus demonstrating the versatility of the nanocomposite for water treatment. Embodiments of the invention include, but are not limited, to those described below.

One aspect of the invention is a method for producing a titania-polymer nanocomposite comprising substantially simultaneously forming TiO$_2$ nanoparticles in situ from a TiO$_2$ precursor in the presence of urea and interfacially polymerizing polyamide precursors thereby producing a titania-polyamide polymer nanocomposite. In some embodiments of this method the TiO$_2$ precursor is TiCl$_4$. In other embodiments of this method the polyamide precursor comprises 1,3 phenylene diamine in an aqueous phase and trimesoyl chloride in a non-aqueous phase and/or the trimesoyl chloride is dissolved in hexane under sonication. In some embodiments of this method the simultaneous forming comprises admixing 1,3 phenylene diamine, TiCl$_4$ and urea to form an aqueous solution, and mixing the aqueous solution with a non-aqueous solution of trimesoyl chloride; or the trimesoyl chloride is added dropwise to the solution under continuous stirring for at least 1, 2, 3, 4, 5 or 6 hours, the resulting solution is then heated to at least 30, 35, 40, 45, 50, 55, 60, 65, 70, 75, 80, 85, 90, 95 or >95° C. for 1, 1.5, 2, 2.5, 3, 3.5, 4, or >4 hours, and then the titania-polymer is recovered by filtration and washed to remove unreacted components.

In other embodiments of this method the trimesoyl chloride is added dropwise to the solution under continuous stirring for at least 8, 12, 16, 20, 24, 26, 28, or 30, preferably for at least 22-26 hours, the resulting solution is then heated to 45-55° C. preferably at 65-75° C., for 1 to 8 hours, preferably for about 2-4 hours. The titania-polymer is recovered, for example, by filtration, sedimentation or centrifugation, preferably by filtration, and can be washed one, two or more times remove unreacted components.

Another embodiment of the invention is a titania-polymer nanocomposite such as that produced by the methods disclosed herein. In some embodiments, this nanocomposite contains 10, 20, 30, 40, 50, 60, 70, 80, 90 or >90 wt % TiO$_2$ the balance being polyamide. In other embodiments, the nanocomposite contains about 40-60 wt % TiO$_2$. In most or in typical embodiments, the nanocomposite will be made by the method of simultaneous formation of TiO$_2$ and polymerization of a polyamide disclosed herein.

In some embodiments, the composition contains a wt/wt ratio of TiO$_2$ to polymer, from about 4:1 to 10:1, from about 6:1 to 8:1 or about 7:1. In other embodiments, the wt/wt ratio of TiO$_2$ to polymer ranges from about 15:1 to 1:15, 10:1 to 1:10 or 7:1 to 1:7.

Another embodiment is directed to titania-polyamide nanocomposite that has a BET surface area ranging from at least 55, 60, 65, 70, 75, 80, 85, 90 to about 200, 150, or 100 m$^2$ g$^{-1}$, preferably about 65-85 m$^2$ g$^{-1}$, a mesopore surface area ranging from at least 30, 35, 40, 45, 50, 55, 60, 65, 70 to 75 m$^2$ g$^{-1}$, preferably from about 43-63 m$^2$ g$^{-1}$, and a micropore surface area ranging from at least 10, 15, 20, 25, 30, 35, to 40 m$^2$ g$^{-1}$, preferably from about 15-30 m$^2$ g$^{-1}$.

For example a nanocomposite may have a BET surface area ranging from about 65-85 m$^2$ g$^{-1}$, a mesopore surface area ranging from about 43-63 m$^2$ g$^{-1}$, and a micropore surface area ranging from about 15-30 m$^2$ g$^{-1}$.

Another embodiment of the invention is directed to water treatment apparatus that comprises a substrate to which the titania-polyamide nanocomposite as disclosed herein has been attached. Such a water treatment apparatus may comprise a bed containing the titania-polyamide nanocomposite or that comprises a container containing contaminated water in which particles of the titania-polyamide nanocomposite are circulated or otherwise mixed with contaminated water. Such an apparatus typically includes a bed, preferably a fixed bed, filter or filter membrane containing the TiO$_2$ polyamide nanocomposite disclosed herein to remove organic and metallic contaminants.

It may further include one or more aerators, flocculators, sand filters, coaggulation aids such as polyelectrolytes, and sedimentation tanks or pools to remove solids. In some embodiments, contaminated water may be treated to remove oxidants such as chlorine, chloramine, bromine, oxygen, ozone etc.

In other embodiments, a bed, filter or filter membrane comprising the nanocomposite disclosed herein may be regenerated by removing bound metals or organic compounds such as dyes, for example, by contacting it with an acid or with a composition for regenerating such as a chemical agent containing a water-dispersible resin, surfactant or organic acid, or an inorganic colloid. In some embodiments a regenerated TiO$_2$ polyamide nanocomposite will regain at least 50, 60, 70, 80, 90, or 95% of its ability to bind to toxic metals and organic compounds such as dyes.

Another embodiment of the invention is directed to a method for removing at least one organic compound and/or a metal from contaminated water by contacting the contaminated water with the titania-polyamide nanocomposite as disclosed herein. In some embodiments of this method the water is contaminated with the at least one organic compound and at least one metal and the method simultaneously removes the organic compound and metal at a temperature ranging from 10, 15, 20, 25, 30, 35, 40, 45, 50 to >50° C., preferably from about 20-30° C. In some embodiments of this method the organic compound or metal is present in the contaminated water at a concentration of no more than 25, 50, 75, 100, 125, 150, 175, 200, 250, 300, 350, 400, 450 or 500 ppm, preferably no more than 100 ppm. In other embodiments, the organic compound is at least one dye such as methylene-blue or other phenothiazine-based compounds, bromophenol, methyl orange, Congo red and/or rhodamine B. In some embodiments of this method the metal is selected from the group consisting of at least one of As, Se, Cu, Pb, Hg, Cd, Cr, and Ni or mixtures of two, three or more thereof.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 11A, 11B and 11C. The plots of Lagergren's-first order (FIG. 11A), and pseudo-second order (FIG. 11B) and model of Interparticle diffusion at 298 K (FIG. 11C). Experimental conditions: TPN weight: 20 mg, medium volume: 30 mL, MB initial concentration (16 ppm) and temperature: 298 K.

FIGS. 12A, 12B and 12C. The plots of the experimental data using Isotherm model of Langmuir (FIG. 12A), Isotherm model of Freundlich (FIG. 12B), Temkin adsorption isotherms (FIG. 12C). Experimental conditions; TPN amount: 5.0, 10, 20 mg, medium volume: 30 mL, concentration of MB (16 ppm) and temperature: 298 K.

DETAILED DESCRIPTION OF THE INVENTION

Figure 1:
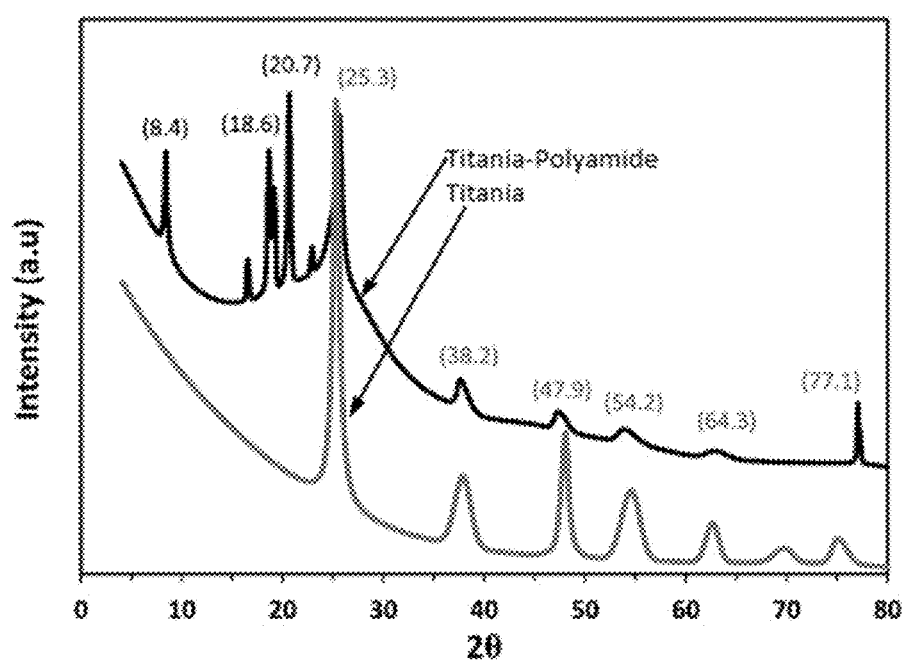
FIG. 1 is a graph illustrating the XRD diffractogram for (a) titania-Polyamide and (b) titania.

The inventors sought to develop an adsorbent which has excellent properties such as mechanical strength, rapid adsorption rate and a high capacity for adsorption useful in treating wastewater. Another objective was to provide a simple method for producing a $TiO_2$ containing nanocomposite with these advantageous properties. As shown herein, the inventors achieved simultaneous combination of the interfacial polymerization of trimesoyl chloride (TMC) and 1,3-phenylene diamine (MPD) with the in-situ formation of $TiO_2$ from $TiCl_4$. The inventors show that combination of the titania with polyamide provided a composite that is improved in comparison to conventionally formed $TiO_2$/polyamide composites and $TiO_2$ and polyamide individually. The $N_2$ physisorption analysis results indicated that the textural properties, like the surface area of TPN, were improved compared with that of polyamide. X-ray mapping shows the efficient distribution of the titania within the polymer structure. The TPN was evaluated for the adsorption of dyes and toxic metals. The TPN showed good removal of several dyes in the order of MB>bromo phenol>methyl orange>Congo red>rhodamine B. Kinetic studies were performed to understand the adsorption mechanism. The kinetic studies indicated that the experimental data fit a second-order mechanistic representation. The thermodynamic studies proved the applicability of the TPN at room temperature since by increasing the temperature the removal percentage decreased. Interestingly, TPN showed simultaneous removal of MB dye and toxic metals including Se, As, Cu, Pb, Hg, Cd, Cr, and Ni. The prepared TPN composite was demonstrated to be an efficient adsorbent for the simultaneous removal of dyes and toxic metals.

Trimesoyl chloride is preferably used as a precursor to form the nanocomposite disclosed herein. In some alternative embodiments, trimesoyl chloride may be substituted with another polyamide forming precursor such as trimesoyl [4,4-dimethyl-5(4H)-azlactone].

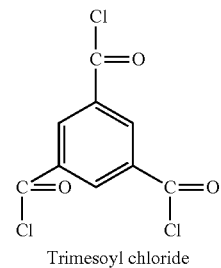 [SMILES: O=C(Cl)c1cc(C(=O)Cl)cc(C(=O)Cl)c1]
Trimesoyl chloride

Solvents. Preferably hexane is used as a solvent for TMC in the methods as disclosed herein. Alternatively, other solvents such as benzene, cyclohexane, heptane, benzene, toluene, pentane, cyclopentane, 1,4-dioxane, chloroform, diethyl ether or other non-polar solvents may be substituted for hexane.

Diamines. Preferably 1,3 phenylene diamine is used to produce the nanocomposite of the invention. In some alternative embodiments other diamines, compounds bearing two amine groups may be substituted for or mixed with 1,3 phenylene diamine. These include p-phenylenediamine (1,4, phenylene diamine), o-phenylenediamine (1,2 phenylene diamine), xylylenediamines, such as m-xylylenediamine, p-xylylenediamine, or o-xylylenediamine, dimethyl-4-phenylenediamine, benzidine, and other aromatic, linear or branched diamines that can polymerize with trimesoyl chloride.

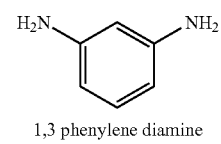
1,3 phenylene diamine $TiO_2$ precursors include titanium(III) chloride-$TiCl_3$, titanium(IV) bromide (titanium tetrabromide)-$TiBr_4$, titanium (IV) chloride (titanium tetrachloride)-$TiCl_4$, and titanium (IV) iodide (titanium tetraiodide)-$TiI_4$. The use of $TiO_2$ precursors permits formation of $TiO_2$ in situ in contrast to prior art methods that use ready or preformed $TiO_2$. It is not necessary to functionalize the $TiO_2$ produced by the method disclosed herein, for example, with amine or other groups.

Alternative methods for producing nano $TiO_2$. Besides the method disclosed herein, nano $TiO_2$ may be synthesized by various other methods such as those described by Byranvand, et al. JNS (2013) 1-9; hypertext transfer protocol://ns.kashanu.ac.ir/pdf 5436 20d28461e8600e7c915 eab3d24924117.html (incorporated by reference). $TiO_2$ nanoparticles may also be produced by mechanical processes.

Toxic metals include Al, As, Ba, Cd, Cr, Cu, Fe, Pb, Mn, Hg, Se, and Ag as well as those described at hypertext transfer protocol secure://en.wikipedia.org/wiki/Heavy metals (incorporated by reference, last accessed Aug. 1, 2019).

Water treatment or waste water treatment is any process that improves the quality of water to make it more acceptable for a specific end-use. The end use may be drinking, industrial water supply, irrigation, river flow maintenance, water recreation or many other uses, including being safely returned to the environment. Water treatment removes contaminants and undesirable components, or reduces their concentration so that the water becomes fit for its desired end-use. This treatment is crucial to human health and allows humans to benefit from both drinking and irrigation use. Water to be treated includes ground water, rain water, condensates, water from rivers, lakes or streams, run-off water, and residential, commercial or industrial waste water.

The concentration of a particular contaminant in water or waste, such as a toxic metal or organic compound, may be reduced to <100, 90, 80, 70, 60, 50, 40, 30, 20, 10, 5, 2, 1, 0.5, 0.2, 0.1, 0.05, 0.02, 0.01 or <0.01% of its initial concentration by the methods disclosed herein.

The water purification methods described herein may be used, optionally in conjunction with other processing or purification steps, to reduce the content of toxic metals and other contaminants to those meeting EPA, state, tribe, or local standards.

The U.S. Environmental Protection Agency (EPA) allows the following concentrations of toxic metals in waste: Ar (5.0 ppm), Ba (100.0 ppm), Cd (1.0 ppm), Cr (5.0 ppm), Pb (5.0 ppm), Hg (0.2 ppm), Se (10.0 ppm) and Ag (5.0 ppm). The methods disclosed herein may be used to lower toxic metal concentrations to meet the above EPA standards or to further reduce toxic metal concentrations below what is required by these standards, for example, by further reductions to <100, 90, 80, 70, 60, 50, 40, 30, 20, 10, 5, 2, 1, 0.5, 0.2, 0.1, 0.05, 0.02, 0.01 or <0.01% of its EPA permissible concentration in waste or to meet EPA drinking water standards EPA drinking water standards (goal or maximum contaminant level) for these and other contaminants are incorporated by reference to hypertext transfer protocol secure: //www.epa.gov/ground-water-and-drinking-water/national-primary-drinking-water-regulations (last accessed Aug. 2, 2019). For example, for As (goal: 0 mg/mL and MCL: 0.010 mg/L: goal/MCL), for Ba (2 mg/L), for Cd (0.005 mg/L), for Cr (0.1 mg/L), for Pb (goal: 0 mg/mL and MCL: 0.015 mg/L), Hg (0.002 mg/L), and Se (0.05 mg/L) where MCL is maximum contaminant level.

EPA secondary MCL standards for drinking water for Al are 0.05 to 0.2 mg/L, for Cu 1.0 mg/L, for Fe 0.3 mg/L, for Mn 0.05 mg/L, 0.1 mg/L for Ag and for Zn 5 mg/L. The methods disclosed herein may be used to reduce Al, Cu, Fe, Mn or Zn in water to meet these secondary drinking water standards or to exceed them by further reductions to <100, 90, 80, 70, 60, 50, 40, 30, 20, 10, 5, 2, 1, 0.5, 0.2, 0.1, 0.05, 0.02, 0.01 or <0.01% of the permissible concentrations. Secondary EPA MCL standards for metals and other contaminants are incorporated by reference to hypertext transfer protocol secure: //www.epa.gov/dwstandardsregulations/secondary-drinking-water-standards-guidance-nuisance-chemicals (last accessed Aug. 2, 2019).

Filters, membranes. The $TiO_2$ polyamide nanocomposite (TPN) of the invention may be formulated as a membrane, such as a filter membrane, membrane/deep filter combination, filter body, or reverse osmosis membrane. In some embodiments, a pore forming agent such as an ethylene glycol may be incorporated into the nanocomposite during synthesis of a filter or filter membrane. In some alternative embodiments the TPN may be formulated as nanoparticles or microparticles, as a bed of TPN particles, as a substrate coated with TPN, or as a substrate material into which TPN has been incorporated.

Regeneration. In some embodiments, once used to adsorb metals or organic molecules such as dyes, the nanocomposite may be regenerated and recycled for subsequent use as an adsorbent, for example, contacting a filter, membrane, bed or other material comprising the $TiO_2$ polyamide nanocomposite disclosed herein with 0.25, 0.5, 0.75, 1, 1.25, 1.5, 1.75, or 2M nitric acid or another acid which permits elution of a bound heavy metal or an organic solvent such as acetone, methyl ethyl ketone, methyl acetate, or so-called green acetones such as Replacatone™ (hypertext transfer protocol secure: //www.tapplastics.com/uploads/pdf/MSDS%20 Replacetone.pdf, incorporated by reference, last accessed Aug. 2, 2019) or BioSolv™ (hypertext transfer protcol secure//syndel.com/wp-content/uploads/2019/02/Biosolve-SDS.pdf, incorporated by reference, last accessed Aug. 2, 2019) to remove an organic component such as a dye from the nanocomposite and optionally washing the nanocomposite prior to reuse. TPM can also be regenerated using a solvent comprising nitric acid, acetone and other organis solvents.

Other applications. Besides use of the titania-polyamide nanocomposite (TPN), or water treatment apparatuses or water filters for removal of organic contaminants such as dye, or heavy metals, it may be incorporated into coatings and other materials to provide UV resistance, self-cleaning coatings or materials, inks, cosmetics, paper, plastics, special functional coatings such as magnetic coatings, clothing or fibers including masks, gloves and other protective gear, air and water filters including nanofiltration membranes, and antiseptic and antimicrobial products.

EXAMPLES

Chemicals including titanium chloride (molecular weight of 189.68 g/mol and purity of 99%), hexane (molecular weight of 86.18 g/mol and purity of 99%), urea (molecular weight of 63.05 g/mol and purity of 98%), and trimesoyl chloride, $C_9H_3Cl_3O_3$, (TMC) (molecular weight of 265.47 g/mol, and purity of 98%) were purchased from Sigma Aldrich. 1,3 Phenylene diamine, $C_6H_4(NH_2)_2$, (MPD) (molecular weight of 108.14 g/mol and purity of 98%) was purchased from Fluka.

Synthesis of materials. The titania-polymer nanocomposite (TPN) was synthesized by in situ interfacial polymerization which was simultaneously combined with the in-situ formation of $TiO_2$ from $TiCl_4$ using urea.

About 100 mL de-ionized water was used to dissolve 2 g of 1,3 phenylene diamine. 20 mL of $TiCl_4$ was then added to the phenylene diamine solution.

Then 1.5 g of urea was added and stirred for 10 min.

On the other side, 50 mL hexane was used for dissolving 0.2 g of trimesoyl chloride by sonication.

This solution was added dropwise to the previous mixture under continuous stirring.

After that, the complete mixture was kept under stirring for about 24 h, then it was heated at 70° C. for 3 h.

The obtained composite was filtered and washed to remove any unreacted components.

For the purpose of comparison, both pure titania and pure polyamide were also prepared. The polyamide was prepared by following the same steps without adding $TiCl_4$ and the titanium oxide was prepared by the following steps: $TiCl_4$ of volume 50 mL was added slowly to distilled water (200 mL) in an ice bath, after that the beaker was transferred to room temperature. The beaker was kept under stirring for 30 min and the urea (1.5 g) was dissolved in water and then added. The bath temperature increased to 150° C. which was maintained. Urea was added to the solution to enhance the formation of hydroxides. The solution became white colloidal without precipitation, then the solution reaction was left to settle, cool and finally washed 3 times with distilled water.

Characterization and analysis. A scanning electron microscope (SEM) was used to describe the morphology of TPN. An X-Max detector fitted with energy-dispersive X-ray spectroscopy (EDX) was used for the elemental analysis. X-ray mapping was used to illustrate the distribution of titania on the surface of the TPN.

The X-ray powder diffraction (XRD) diffractogram was obtained using an X-ray diffractometer through radiation of Cu-Kα.

The BET surface area was measured on a Micromeritics TriStar II Plus automatic analyzer using $N_2$ adsorption-desorption at −196° C. Prior to measurement, the sample was degassed at 150° C. for 3 hr to remove impurities or moisture. The Brunauer, Emmett, and Teller (BET) method were used to calculate the surface area. A Thermo Scientific FTIR spectrometer was used to perform IR measurements with a deuterated triglycine sulfate detector. Spectra background corrections were done at a resolution of 2 $cm^{-1}$ and 32 scans were made.

A UV-vis spectrophotometer with optical quartz cuvettes was used to monitor the dye concentrations.

An Inductively Coupled Plasma Mass Spectrometer (ICP-MS) was used to analyze the concentration of metal ions in the samples.

Adsorption evaluation. A methylene blue (MB) dye solution with a concentration of 16 ppm was prepared. The initial pH of the solution was 6. Then, TPN was added and the contents were stirred for various periods and at different temperatures. Then, at different intervals, aliquots were collected and analyzed using UV-vis spectrophotometer at X of 665 nm. The removal percentage of the dyes was then calculated. Several factors were investigated including dosage or concentration, contact time, temperature and interference effect.

For evaluating dosage, the initial concentration of the dye was kept constant, 16 ppm. Different dosages of the TPN were used. Then experiments at different temperatures of 298, 318 and 338 K were done to describe the thermodynamic and kinetic parameters.

The interference effect was studied using 20 mg of adsorbent in 16 ppm dye solution spiked with 1 ppm of metals including Ni, Cu, Pb, Se, As, Hg, Cd, and Cr.

The adsorption capacity and removal percentage of the adsorbent is computed using Eqs. (1) and (2):

$$q_t = \frac{(C_i - C_t)V}{W} \quad (1)$$

$$\text{Removal efficiency (\%)} = \left(\frac{C_i - C_t}{C_i}\right) \times 100 \quad (2)$$

where, $C_i$ and $C_t$ represent concentrations of methylene blue (MB) (initial and final, respectively); V and W denote the volume of solution (L) and material weight (g). The capacity of adsorption at different times and equilibrium are expressed as $q_t$ and $q_e$, respectively, where in the case of $q_e$, the equilibrium concentration $C_e$ is used instead of $C_t$. The analysis was done in triplicate and the average value was taken.

TABLE 1

The BET parameters of TPN and polyamide.

| Parameter | TPN | Polyamide |
|---|---|---|
| Total pore volume | 0.13 $cm^3 \cdot g^{-1}$ | 0.12 $cm^3 \cdot g^{-1}$ |
| Micropore volume | 0.14 $cm^3 \cdot g^{-1}$ | 0.15 $cm^3 \cdot g^{-1}$ |
| Average pore diameter | 94.4 Å | 82 Å |
| Mesopore surface area | 53.1 $m^2 \cdot g^{-1}$ | 7 $m^2 \cdot g^{-1}$ |
| Micropore surface area | 22.5 $m^2 \cdot g^{-1}$ | 3 $m^2 \cdot g^{-1}$ |
| BET surface area | 75 $m^2 \cdot g^{-1}$ | 10 $m^2 \cdot g^{-1}$ |

Characterizations of the samples. From the XRD diffractogram, there are characteristic peaks of titania nanoparticles that can be observed at 2θ of 25.3°, 38.2°, 47.9°, 54.2°, 64.3° and 77.1°, as shown in FIG. 1. Also, there is a characteristic peak of the polymer at 18.6°. Peaks at 2θ of 8.4° and 20.7° are related to the TPN structure clarifying its crystalline nature. These results confirmed the successful embedding of titanium oxide into the polyamide during the formation of TPN.

Figure 2A:
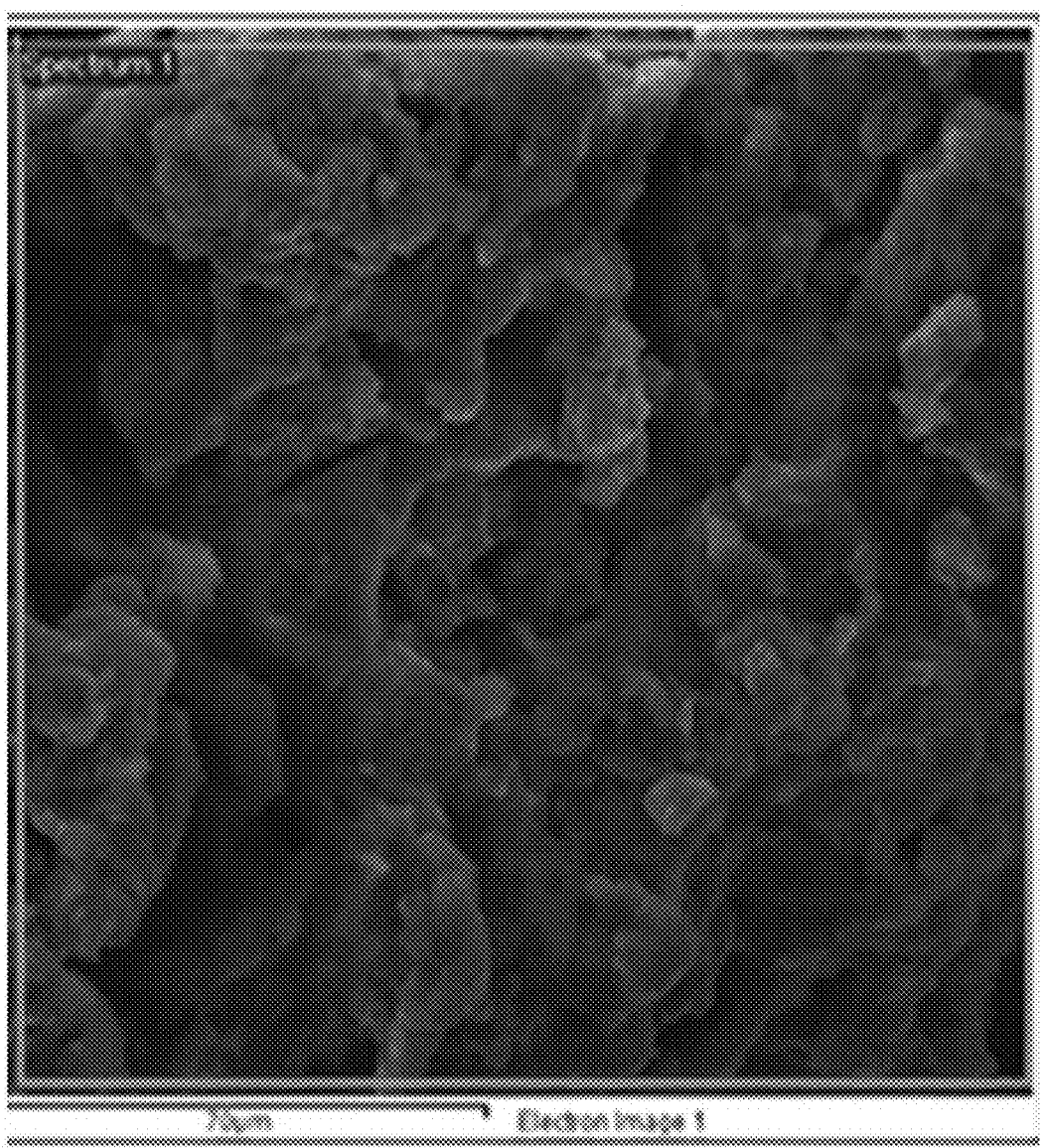
FIG. 2A. SEM image of TPN.

FIG. 2A illustrates the SEM image indicating the morphology of the sample in which the nanoparticles are embedded. The EDX in FIG. 2D describes the presence of elements which can be observed at 0.277 for carbon, 0.392 for nitrogen and 0.525, 4.5 and 4.9 keV for titanium. The nitrogen peak is overlapped with the oxygen and titanium peaks. The spectrum clarifies a set of peaks for titanium represented by 15.87 wt % and 36.49 for Ti and O, respectively. This wt % indicates that titanium oxide is embedded successfully inside the polyamide.

Figure 2B:
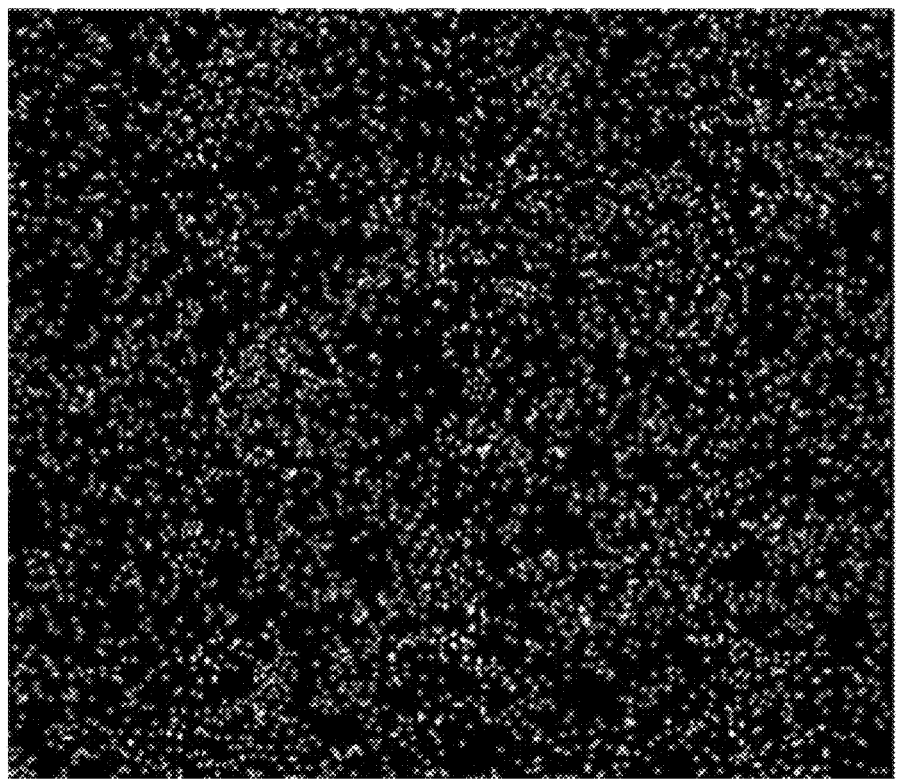
FIG. 2B. X-ray mapping of Ti and O in the TPN.

FIG. 2B depicts the X-ray mapping which shows the dispersion of titania nanoparticles within the polymer. As shown in the mapping images for titanium, there is a uniform distribution of the nanoparticles inside the composite.

Figure 2C:
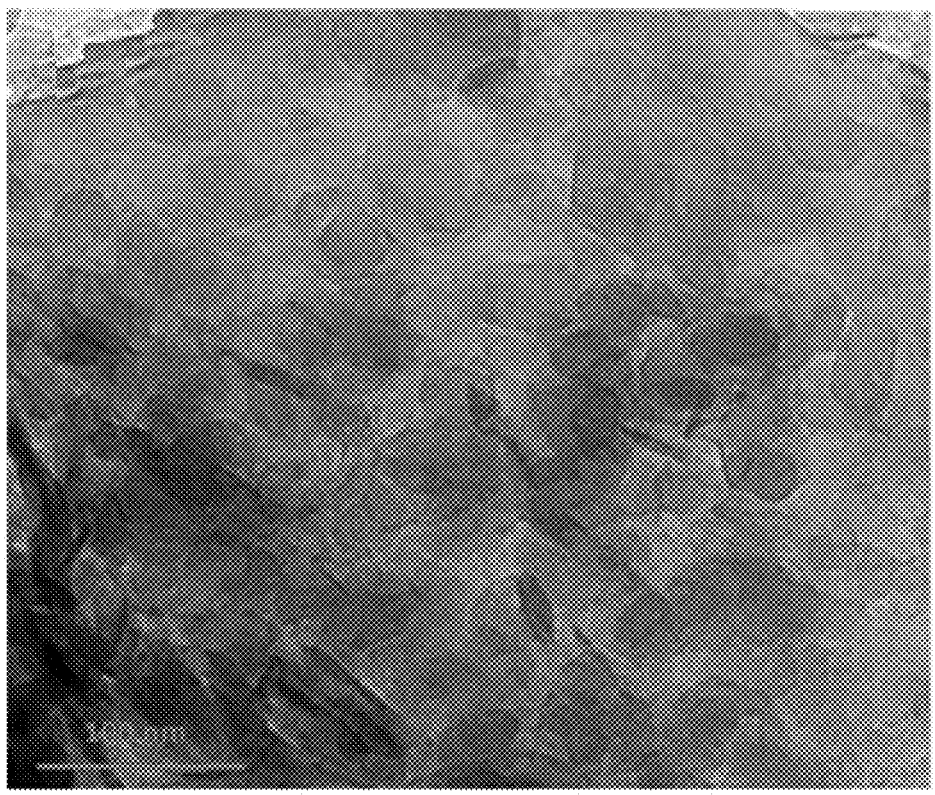
FIG. 2C. TEM image of the prepared TPN (FIG. 2C).
Figure 2D:
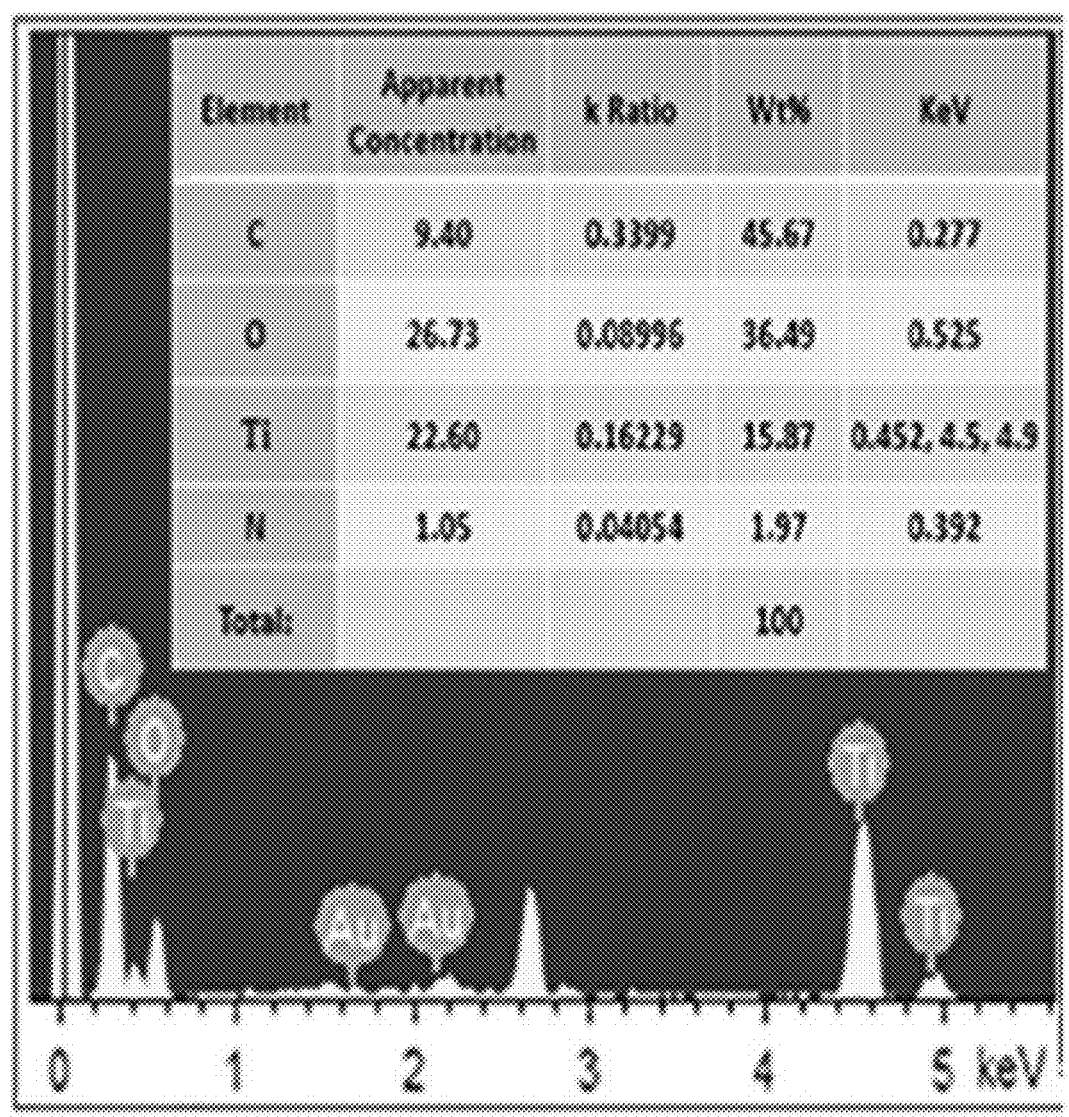
FIG. 2D. EDX spectrum with a table of EDX elemental analysis (FIG. 2D).

This was confirmed by the TEM image FIG. 2C, which shows the formation of titania particles within the polymer.

TABLE 2

Kinetic parameters of dye adsorption on the TPN; $C_i$ (16 ppm)

| Lagergren's first order | | | | Pseudo-second order | | | Intraparticle diffusion | | |
|---|---|---|---|---|---|---|---|---|---|
| $q_e$, exp. (mg/g) | $k_f$ (min$^{-1}$) | $q_e$, cal (mg/g) | $R^2$ | $k_2{}^a$ | $q_e$, cal (mg/g) | $R^2$ | $k_{id}{}^b$ | C (mg/g) | $R^2$ |
| 22.7 | 0.052 | 6.78 | 0.64 | 0.0112 | 23.1 | 0.998 | 0.163 | 1.36 | 0.976 |

Figure 3A:
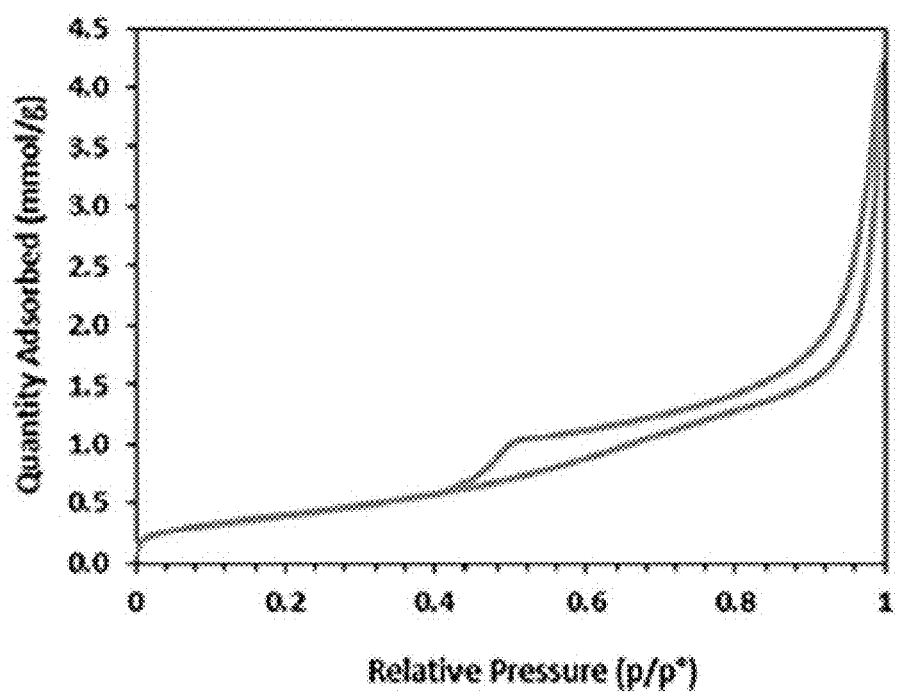
FIG. 3A is a graph illustrating the BET data of TPN: nitrogen adsorption/desorption isotherms.
Figure 3B:
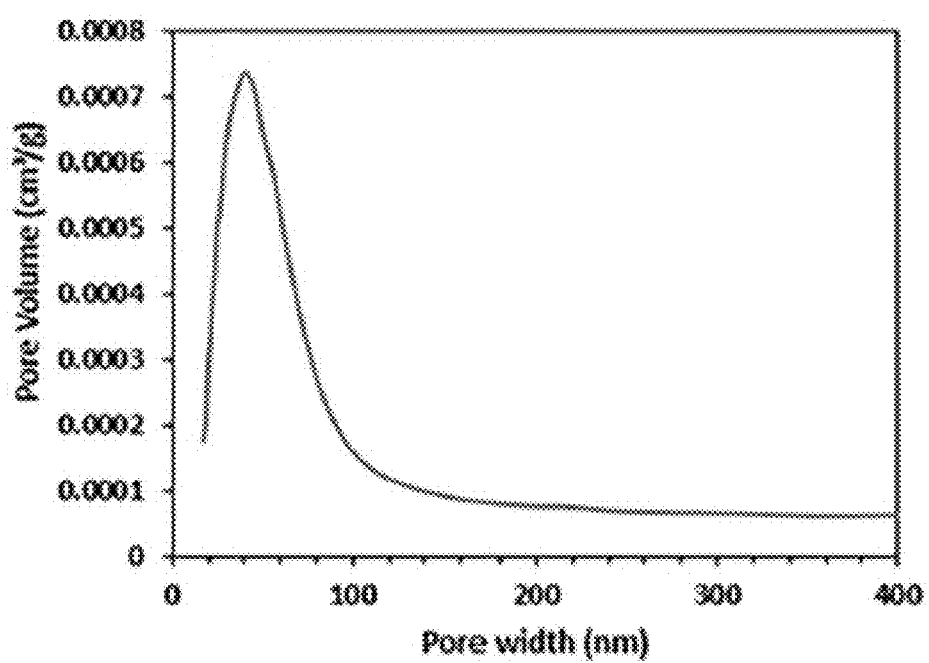
FIG. 3B graph illustrating the BET data of TPN: pore size distribution curve.

The $N_2$-physisorption analysis was performed to investigate the textural properties of TPN. FIG. 3A depicts the BET isotherm plot which indicates that the isotherm belongs to type II with uniform surface energy and multilayer adsorption. The uptake of nitrogen at relatively low pressures gives an indication for the sample with a microporous structure. The mesoporous structure of TPN has been confirmed by a loop of hysteresis at a pressure that is relatively high. Other parameters obtained from the analysis were summarized in Table 1. The BET surface area of the TPN nanocomposite is shown to be 75 m²/g compared with 10 (m²/g) of the polymer. The pore size distribution indicated that the TPN material has a size in the range of 20-100 nm, as shown in FIG. 3B.

Figure 4:
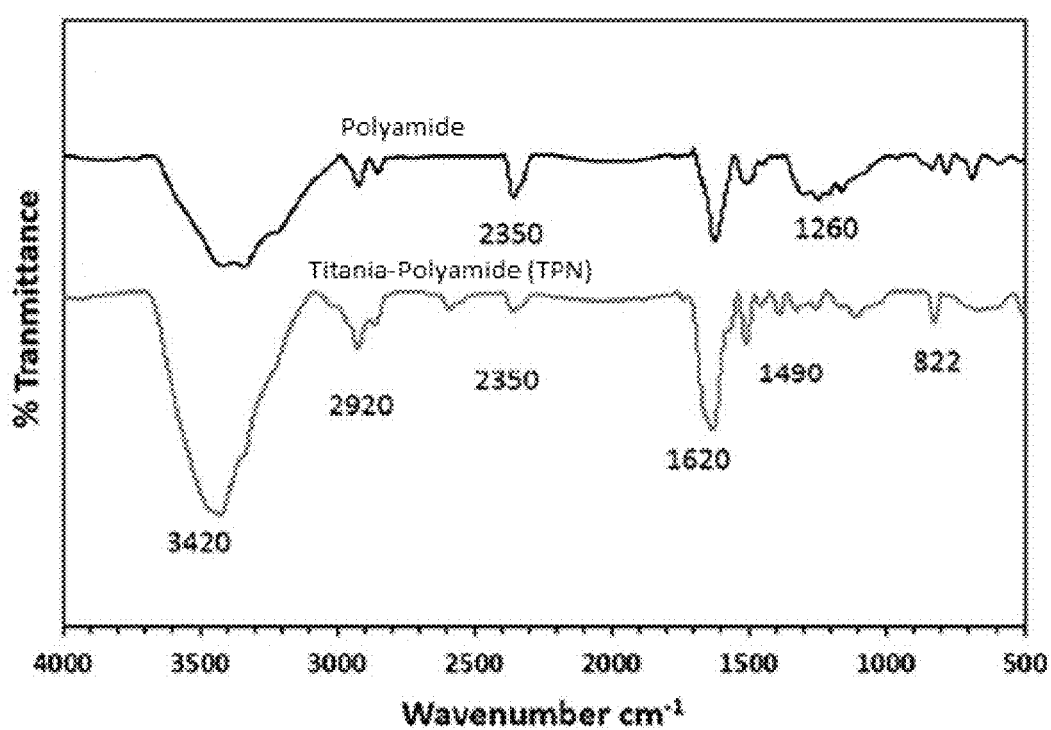
FIG. 4 is a graph illustrating the FTIR spectra of (a) polyamide and (b) titania-polyamide (TPN)

FIG. 4 illustrates the FTIR spectra of polyamide and TPN composite. The broad band observed in the range of 3300-3500 cm$^{-1}$ was attributed to N—H stretching vibration of 1,3 phenylenediamine. The peaks recorded at 2920 cm$^1$ and 2850 cm$^1$ were related to C—H stretching vibration. Another absorption band for C═O stretching vibration appeared at 1620 cm$^1$.

Figure 5:
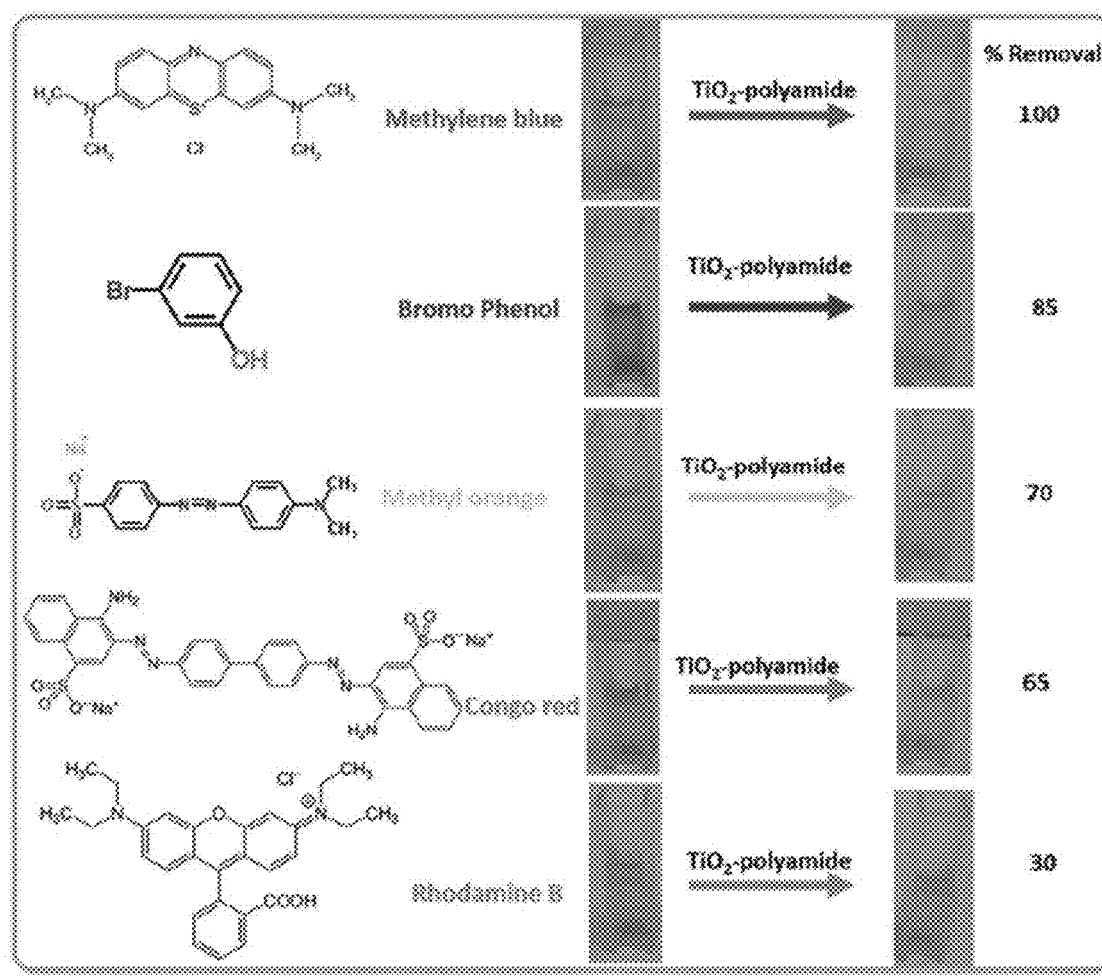
FIG. 5 is a scheme illustrating the color changes of the dye solutions before and after the interaction with TPN; [experimental conditions: adsorbent mass 20 mg, volume 20 mL of each dye solution, contact time 60 min, temperature 298 K]

Evaluation of dye adsorption efficiency. The adsorption efficiency of the prepared TPN material was tested using different dyes. The dye solutions were prepared separately, and 20 mg TPN was added to each of them. The contact time was allowed until equilibrium was obtained. The concentration of the dye was determined by a UV-vis spectrophotometer. It was found that the performance of the TPN differs from one dye to another depending on the nature and the structural size of the dyes. The percentage removal of the dyes over the TPN was found to be in the following order of methylene blue>bromo phenol>methyl orange>Congo red>rhodamine B, FIG. 5. For MB, the removal was ≈100% so it was chosen for further investigation. It should be also mentioned that the adsorption efficiency of TPN, titania, and polyamide was tested under the same conditions. TPN showed better efficiency than both titania and pure polyamide because TPN composite combines the properties and the functional groups of both titania and polyamide. This allows having more active sites for adsorption.

Figure 6:
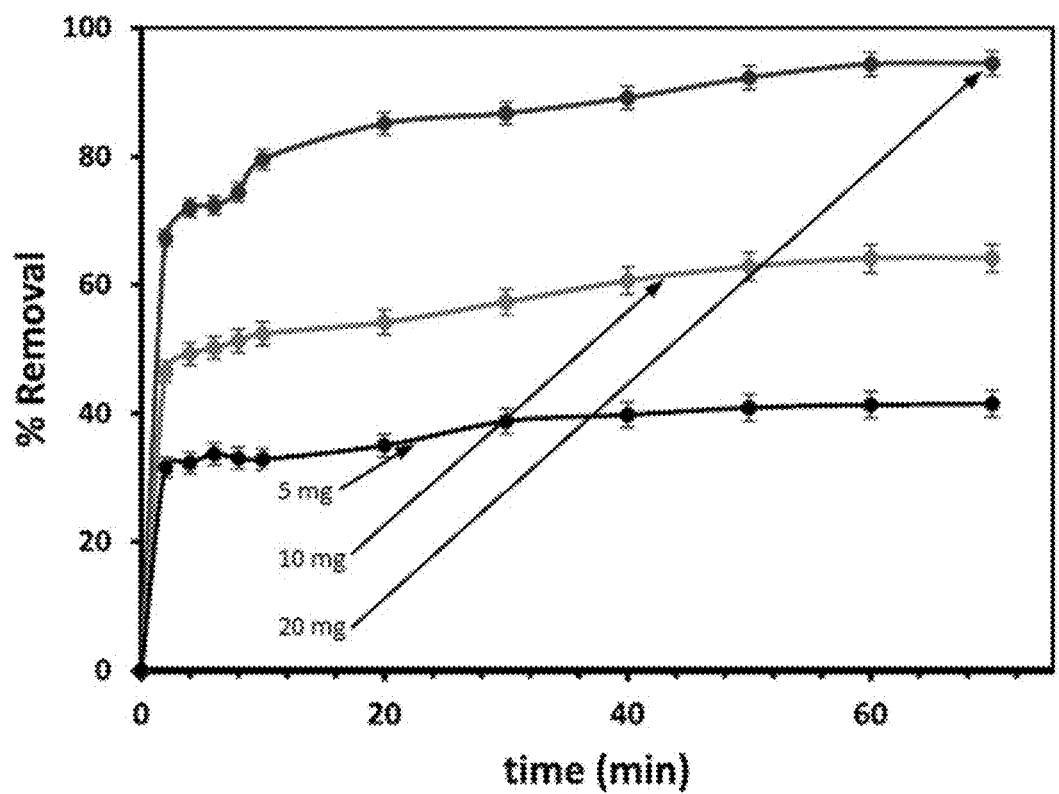
FIG. 6 is a graph illustrating the effect of contact time on adsorption of MB with solutions containing different TPN masses [Experimental conditions; the amount of TPN: 5, 10 and 20 mg, medium volume: 30 mL, concentration of MB (16 ppm) and temperature: 298 K].

Contact time. Different dosages of TPN (5, 10, and 20 mg) were added to dye solutions (30 mL each) having an initial concentration of 16 ppm. In these batch experiments, the dependence of the adsorption capacity on contact time at a room temperature of 298 K was evaluated. The fast dye adsorption rate with steep slopes indicates that the adsorption equilibrium was obtained within 20 min as shown in FIG. 6. This fast uptake makes the TPN promising for its use in real treatments.

Adsorption kinetics. Kinetic models of pseudo-second order and Lagergren's first order were used for examining the adsorption mechanisms. Linear Eq. (3) was used for the first order model:

$$\ln(q_e - q_t) = \ln q_e - k_1 t \quad (3)$$

where the dye amount (mg, g$^{-1}$) is adsorbed at equilibrium and t which are represented by $q_e$ and $q_t$ respectively, while the rate constant is represented by $k_1$, $q_e$ and $k_1$ values were obtained by plotting $\ln(q_e-q_t)$ versus t as shown in FIG. 11A and Table 2. The poor correlation coefficients ($R^2$) and the disagreement between the calculated values of ($q_{e,\ cat}$) and the experimental ($q_e$, exp), gives an indication that the adsorption rate does not correlate with the first-order model. When studying the second-order rate of adsorption, the following Eq. (4) was used:

$$\frac{dq_t}{dt} = k_2(q_e - q_t)^2 \quad (4)$$

where the rate constant is represented by $k_2$, $q_t$ and $q_e$ are the capacities of adsorption at time t and at equilibrium. The linear form of the pseudo-second-order is described as the following:

$$\frac{t}{q_t} = \frac{1}{k_2 q_e^2} + \frac{t}{q_e} \quad (5)$$

where the rate constant value $k_2$ is obtained from the plot of $t/q_t$ versus t as shown in FIG. 11B. There is an agreement between $q_e$, exp and the $q_e$, cal and the high correlation coefficient values clarified that the process of adsorption fitted to the pseudo-second-order model. This is an indication that the dye ions adsorption possibly occurred via a predominantly chemical interaction.

Weber's intraparticle diffusion model was used for fitting the adsorption results by using Eq. (6):

$$q_t = k_{id} t^{1/2} + C \quad (6)$$

where the rate constant of intraparticle diffusion is represented by a $k_{id}$ (mg·g$^{-1}$·min$^{1/2}$), and the intercept (mg·g$^{-1}$) is C. As per the experimental data, the linearity varies to some extent when plotting $q_t$ versus $t^{1/2}$ which indicates the rate-limiting step by intraparticle diffusion. As shown in FIG. 11C, the intraparticle diffusion is represented by linear portions. The external surface adsorption is the first stage and was completed within the first min. The second stage represents the intraparticle diffusion stage known as the rate determining step. This stage was observed in <20 min. The plot contains a third region where the interparticle diffusion begins to diminish. The linear line of the second stage didn't intercept with the origin point because the final and initial stages of the adsorption process have a different mass transfer rate indicating that the interparticle diffusion wasn't the only rate limiting step.

TABLE 3

Isotherm parameters of Langmuir, Freundlich, and Temkin for the dyes adsorption.

| Langmuir | | | | Freundlich | | | | Temkin | | |
|---|---|---|---|---|---|---|---|---|---|---|
| $q_m$ (mg/g) | $k_L$ | $R_L$ (L/mg) | $R^2$ | 1/n | n | $k_f$ (mg/g) | $R^2$ | $K_r$ (L/g) | $b_r$ (KJ/mol) | $R^2$ |
| 43 | 0.833 | 0.13 | 0.9606 | 0.22 | 4.59 | 3.13 | 0.9254 | 1.004 | 0.383 | 0.8775 |

Adsorption isotherms. A good analysis of adsorption capacities was conducted using isotherm models with fundamental physicochemical data. The Isotherm model of Langmuir is based on the idea of a homogenous monolayer surface phase. The nature of the process, either chemical or physical, can be described through it:

$$\frac{C_e}{q_e} = \frac{1}{k_L q_m} + \frac{C_e}{q_m} \quad (7)$$

where $k_L$ (L·mg$^{-1}$), $q_m$ (mg·g$^{-1}$), $q_e$ (mg·g$^{-1}$) and $C_e$ (mg·L$^{-1}$) clarify the sites of adsorption affinity; the theoretical monolayer adsorption capacity, the amount adsorbed of MB and its equilibrium concentration, respectively.

FIG. 12A shows the $C_e/q_e$ versus $C_e$ plot, where the $k_L$ and Langmuir constant $q_m v$ values are obtained from the slope and intercept, shown in Table 3. The dimensionless equilibrium parameter $R_L$ is given in Eq. (8):

$$R_L = \frac{1}{1 + K_L C_O} \quad (8)$$

where the initial solute concentration is $C_o$. $R_L$ is the equilibrium factor and indicates the adsorption, if $R_L=1$ linear, $R_L>1$ unfavorable, $0<R_L<1$ favorable and $R_L=0$ irreversible. The adsorption favorability by the $R_L$ value of 0.13 was confirmed. The TPN adsorption capacity ($q_m$) and other parameters are listed in Table 3.

Heterogeneous surfaces and their adsorption characteristics were illustrated by the Freundlich model considering the interactions of adsorbed molecules, as:

$$q_e = K_f C_e^{\frac{1}{n}} \quad (9)$$

$K_f$ (mg·g$^{-1}$) represents the constant of the Freundlich isotherm and 1/n describes the capacity of adsorption and its intensity, respectively. The adsorbate concentration (mg·L$^{-1}$) and the amount adsorbed (mg·g$^{-1}$) at equilibrium are represented by $C_e$ and $q_e$. The model is:

$$\ln q_e = \ln K_f + \frac{1}{n} \ln C_e \quad (10)$$

The plot ln $q_e$ versus ln $C_e$ is used to calculate the values of $K_F$ and n as shown in FIG. 12B and included in Table 3. The nature of the adsorption processes is described by the n value where: 1/n<1 and >1 imply a cooperative and a normal adsorption, respectively. The obtained results indicate the 1/n value of 20.22.

A linear decrease in adsorption energy due to the interaction between adsorbent and adsorbate is assumed by the Temkin model and given as:

$$q_e = \frac{RT}{b_T} \ln k_T + \frac{RT}{b_T} \ln C_e \quad (11)$$

where $b_T$ represents the Temkin isotherm constant and shows the sorption heat (J/mol), while $k_T$ represents the binding constant of the Temkin isotherm equilibrium which describes the highest energy binding (L·g$^{-1}$). T and R are representing the temperature (K) and gas constant, respectively. The isotherm constants are obtained by plotting the $q_e$ versus the ln $C_e$, as shown in FIG. 12C.

Thermodynamic study. Thermodynamic adsorption parameters such as free energy (ΔG°), enthalpy (ΔH°) and the entropy (ΔS°) can be determined to illustrate the process of adsorption and are evaluated using the following Eqs. (12), (13), (14) and (15).

$$K_c = C_{Ae}/C_e \quad (12)$$

$$\Delta G° = -RT \ln K_c \quad (13)$$

$$\Delta G° = \Delta H° - T\Delta S° \quad (14)$$

$$\log k_2 = \frac{E_a}{2.303RT} - \text{constant} \quad (15)$$

Figure 7A:
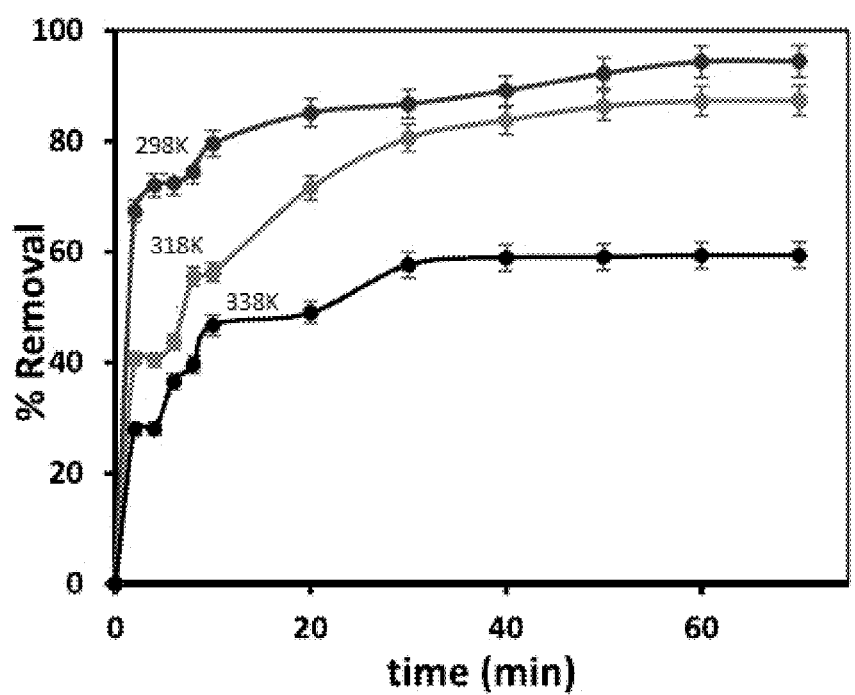
FIG. 7A plots of MB percentage removal versus time at different temperature. Experimental conditions; TPN amount: 20 mg, medium volume: 30 mL, concentration of MB (16 ppm) and temperature: (i) 298 K, (ii) 318 K, (iii) 338 K.
Figure 7B:
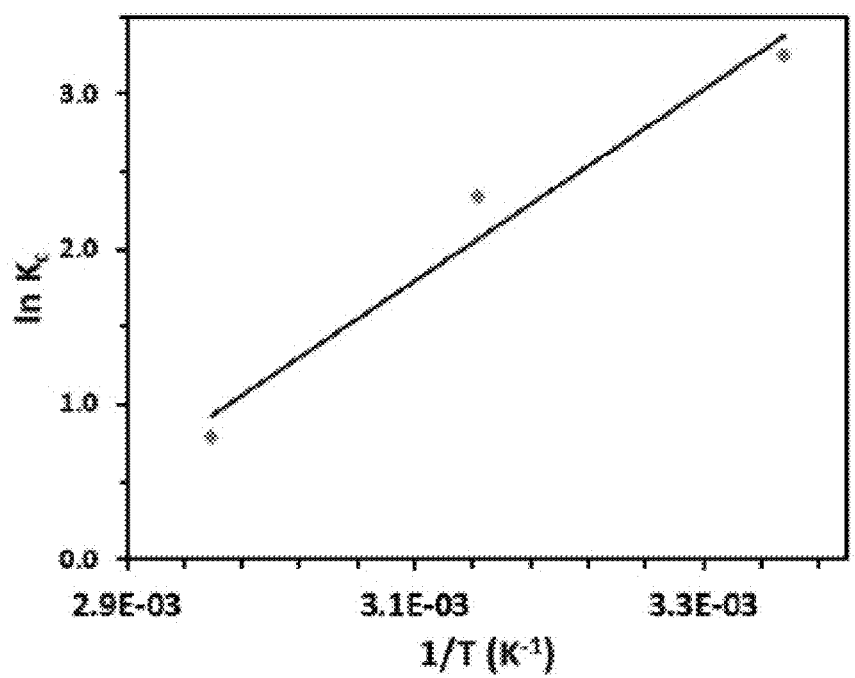
FIG. 7B plots In Kc versus 1/T. Experimental conditions; TPN amount: 20 mg, medium volume: 30 mL, concentration of MB (16 ppm) and temperature: (i) 298 K, (ii) 318 K, (iii) 338 K.

After carrying out the adsorption processes at three different temperatures of 298 K, 318 K, and 338 K, it was found that the removal rate decreases as the temperature of adsorption increases, as shown in FIG. 7. The Van't Hoff equation is used to obtain the lnKc versus 1/T plot in the linear form gave the ΔH° and ΔS° values which can be used to compute the ΔG° using Eq. (14):

$$\ln K_c = -\frac{\Delta H°}{RT} + \frac{\Delta S°}{R} \quad (16)$$

The MB adsorption on TPN was found to be exothermic. The adsorption thermodynamic parameters were calculated. The ΔG° values were in the range of −8.4 (KJ/mol) for 298 K, −5.5 (kJ/mol) for 318 K and to −2.6 (kJ/mol) for 348 K. These values clarified the exothermic behavior for the process of adsorption. As the temperature increases, there is a decrease in the absolute values of ΔG° which indicates that the adsorption of the dye on TPN is an unfavorable process.

On the other side, the negative value of enthalpy ΔH° which is =−51 kJ/mol shows the adsorption as an exothermic process, while the negative value of the entropy ΔS° of −140 J/mol·K reflects the low affinity of the adsorbent toward the pollutant molecules at high temperature.

Figure 8:
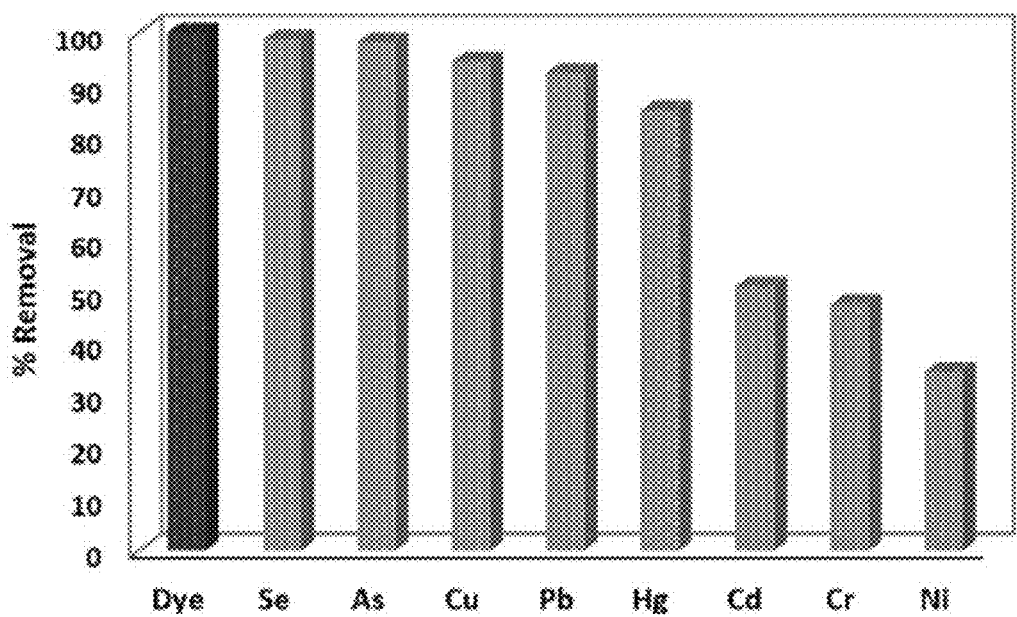
FIG. 8 plots simultaneous removal of MB dye and toxic metals by TPN.

Metals interference effect and recycling. Industrial contamination contains many pollutants which are classified into organic and inorganic components. The process of dye adsorption may be affected by the presence of heavy metals, so it is necessary to investigate the influence of the components. Thus, the removal of MB was performed in the presence of several metals; As, Se, Cu, Pb, Hg, Cd, Cr, and Ni. Then, the dye concentration was analyzed using a UV-vis spectrophotometer and the metals were analyzed using ICP-MS. As shown in FIG. 8, the results indicated that the TPN adsorbed almost 98% the dye.

Figure 9A:
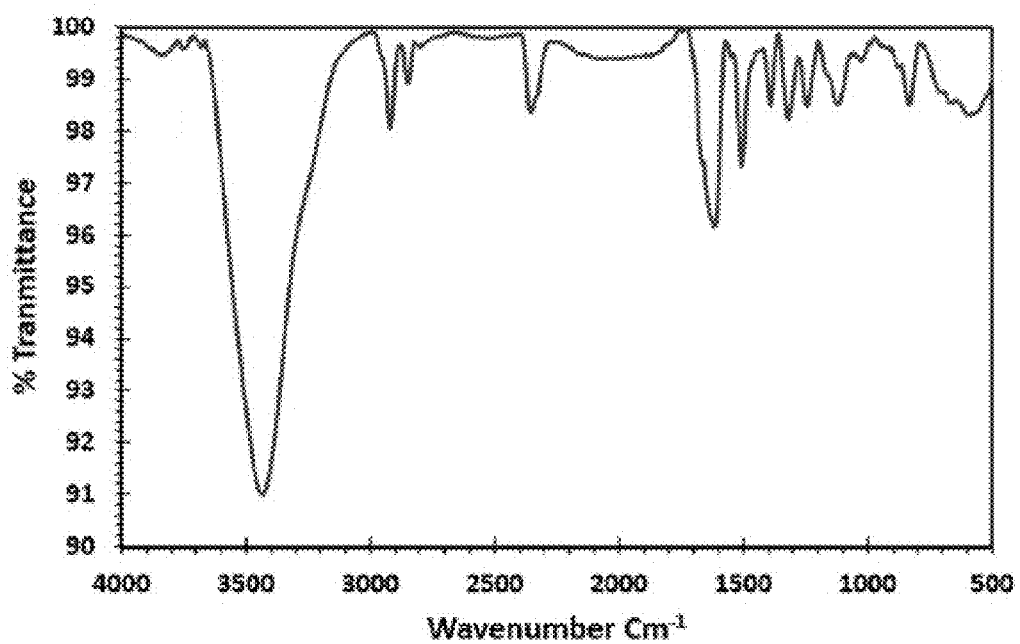
FIG. 9A illustrates the analysis of TPN after dye adsorption by FTIR spectrum.
Figure 9B:
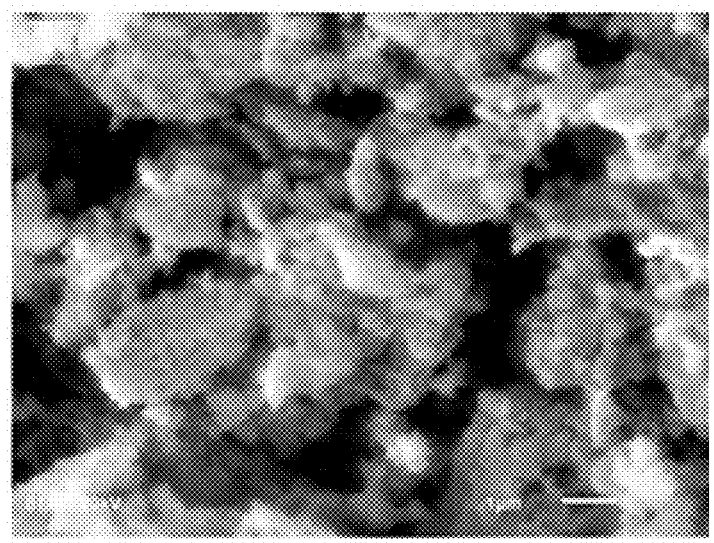
FIG. 9B illustrates the analysis of TPN after dye adsorption by SEM image.
Figure 9C:
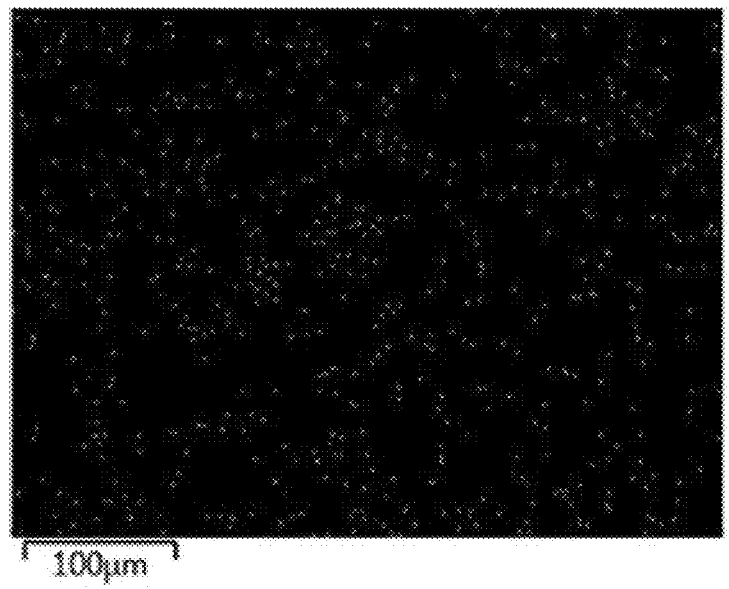
FIG. 9C illustrates the analysis of TPN after dye adsorption by mapping of nitrogen indicating the distribution of the dye on the TPN adsorbent.

In addition, metals like As, Se, Cu, Pb, and Hg were highly co-adsorbed by TPN. This indicates that the TPN has a high efficiency toward cationic species. FIG. 9A illustrates the analysis of TPN after dye adsorption by FTIR spectrum. FIG. 9B illustrates the analysis of TPN after dye adsorption by SEM image and FIG. 9C illustrates the analysis of TPN after dye adsorption by mapping of nitrogen indicating the distribution of the dye on the TPN adsorbent. The analysis of the adsorbent after dye adsorption was conducted to understand the nature of the interaction. As shown in FIG.

Figure 10:
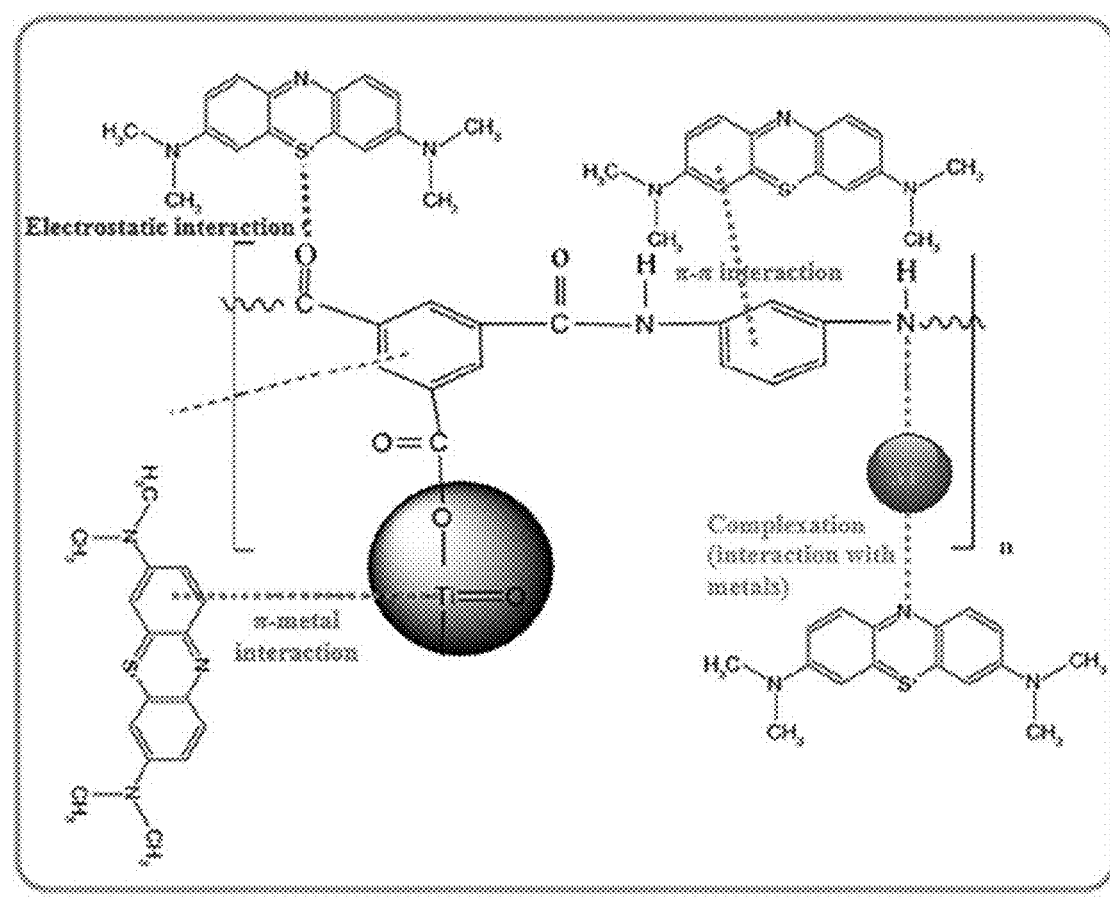
FIG. 10 illustrates the analysis of TPN after dye adsorption (a) FTIR spectrum, (b) SEM image, (c) mapping of nitrogen indicating the distribution of the dye on the TPN adsorbent.

9B, the morphology has not been changed significantly, however, the FTIR spectrum shown more bands as a result of dye adsorbent interaction. As the nitrogen is part of the methylene blue, the nitrogen mapping was conducted and the image indicated that the dye was dispersed on the TPN. The decrease in the affinity of adsorption of some metals could be due to the simultaneous removal of many metals along with the dye. There could be a metal-dye interaction as proposed in the mechanism shown in FIG. 10. Thus, the electrostatic interactions cannot be the only adsorption force, and other complex and varying kinds of interactions could be involved in the adsorption. Possible mechanisms for the adsorption are proposed in FIG. 10, including the $\pi$-$\pi$ interaction and the electrostatic interaction. In addition, a complexation interaction between MB and metals could take place, which can be explained by the high adsorption of MB and the metal ions.

The possibility to recycle the adsorbents, which is important to the industry, was also studied. The spent adsorbent was treated with acetone to dissolve dye and then was treated with a 1 M solution of nitric acid to desorb the metals. The mixture then filtered and the collect TPN adsorbent was dried and reused for the adsorption of the dye and metals which showed almost the same performance with standard deviation, i.e. experimental errors of 5%. The filtrate containing the metals was treated with NaOH to precipitate the metals in metal hydroxide solid form.

As disclosed herein, interfacial polymerization of trimesoyl chloride (TMC) and 1,3-phenylene diamine (MPD) was simultaneously combined with the in-situ formation of $TiO_2$ from $TiCl_4$ using urea. The titania-polyamide nanocomposite (TPN) produced was characterized by using X-ray diffraction, Fourier transform infrared spectroscopy, $N_2$-physisorption analysis and a scanning electron microscope equipped with energy-dispersive X-ray spectroscopy.

The TPN was evaluated as an adsorbent for the removal of dyes and showed high efficiency for the removal of several dyes in the order: methylene blue>bromo phenol>methyl orange>Congo red>rhodamine B. The dosage, contact time, and temperature which are the main factors that affect adsorption efficiency were determined.

Among isotherm models, the experimental adsorption results fitted well with the Langmuir model with a maximum adsorption capacity of 43 mg/g. Kinetic experiments were conducted to describe the equilibrium rate. The model of the pseudo-second-order adequately fitted the experimental data with a correlation coefficient $R^2$ of 0.998.

Thermodynamic studies were performed to evaluate the performance of TPN at various temperatures. Thus, parameters including free energy ($\Delta G°$), enthalpy ($\Delta H°$) and the entropy ($\Delta S°$) were calculated. The influence of the interference on adsorption was investigated in the presence of metals including Ni, Hg, As, Cu, and Cr.

Surprisingly, with $\approx$100% removal of the dye, TPN showed a rapid simultaneous uptake of the toxic metals as well.

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

As used herein, the term "and/or" includes any and all combinations of one or more of the associated listed items and may be abbreviated as "/".

Links are disabled by spelling out of or deletion of "http" or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears.

The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for producing a titania-polymer nanocomposite comprising:
    simultaneously forming $TiO_2$ nanoparticles in situ from a $TiO_2$ precursor in the presence of urea and interfacially polymerizing polyamide precursors thereby producing a titania-polymer nanocomposite,
    wherein the simultaneous forming comprises:
    admixing 1,3 phenylene diamine, $TiCl_4$ and urea to form an aqueous solution, and mixing the aqueous solution with a non-aqueous solution of trimesoyl chloride.

2. The method of claim 1, wherein the $TiO_2$ precursor is $TiCl_4$.

3. The method of claim 1, wherein the polyamide precursor comprises 1,3 phenylene diamine in an aqueous phase and trimesoyl chloride in a non-aqueous phase.

4. The method of claim 3, wherein the trimesoyl chloride is dissolved in hexane under sonication.

5. The method of claim 1, wherein the trimesoyl chloride is added dropwise to the solution under continuous stirring for at least 4 hours, the resulting solution is then heated to at least 50° C. for 2 hours or more, and then the titania-polymer is recovered by filtration and washed to remove unreacted components.

6. The method of claim 1, wherein the trimesoyl chloride is added dropwise to the solution under continuous stirring for at least 22-26 hours, the resulting solution is then heated to at 65-75° C. for 2-4 hours, the titania-polymer is recovered by filtration, and then washed to remove unreacted components.

* * * * *